Aug. 6, 1968     R. J. J. GELIN     3,395,646

HYDRAULIC GEAR PUMPS AND MOTORS

Filed Feb. 7, 1966     5 Sheets-Sheet 1

INVENTOR

ROBERT JEAN JOSEPH GELIN

BY

Bailey, Stephens & Huettig

ATTORNEYS

Aug. 6, 1968  R. J. J. GELIN  3,395,646
HYDRAULIC GEAR PUMPS AND MOTORS
Filed Feb. 7, 1966  5 Sheets-Sheet 2
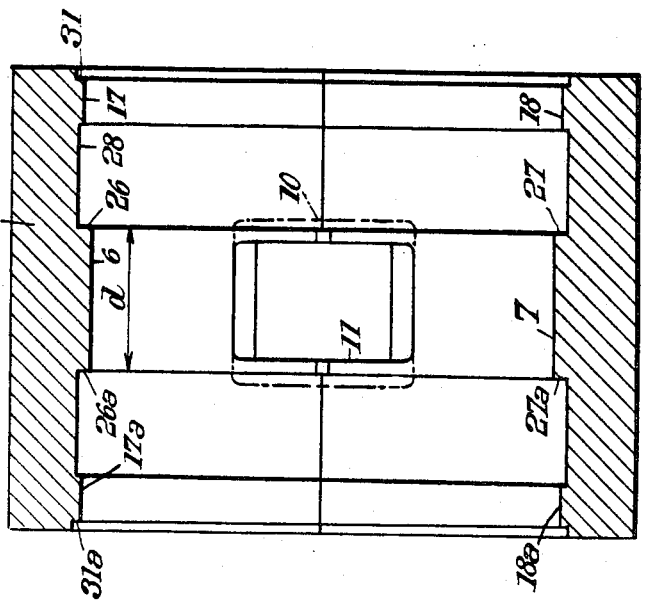
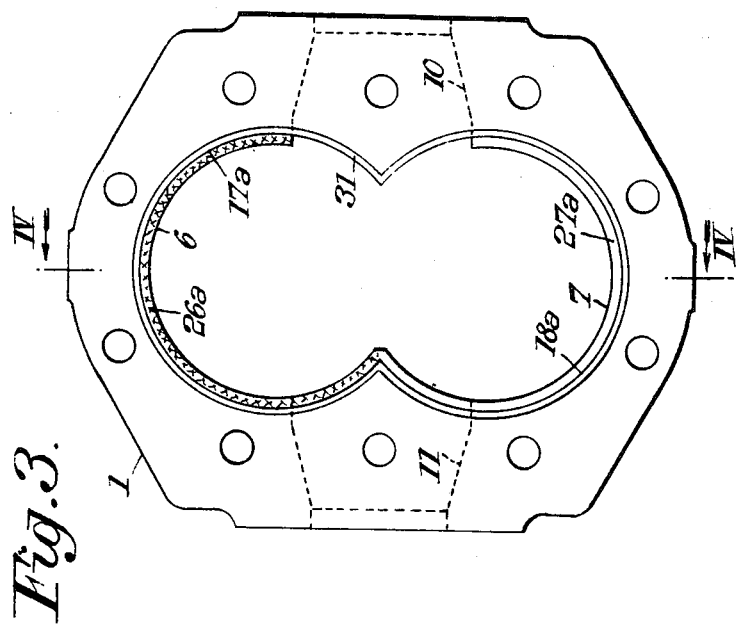
INVENTOR
ROBERT JEAN JOSEPH GELIN
BY
Bailey, Stephens & Huettig
ATTORNEYS

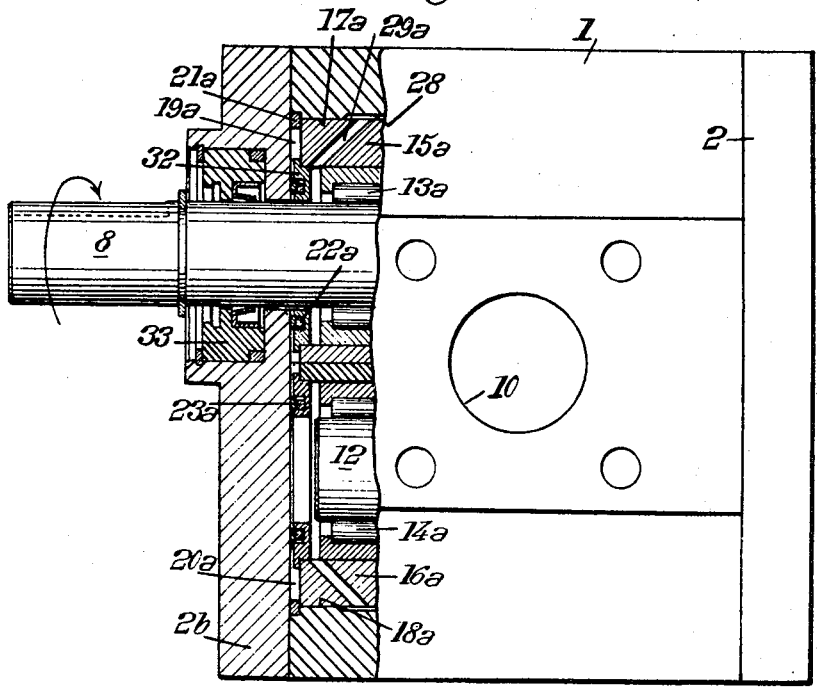
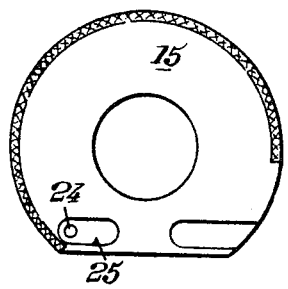
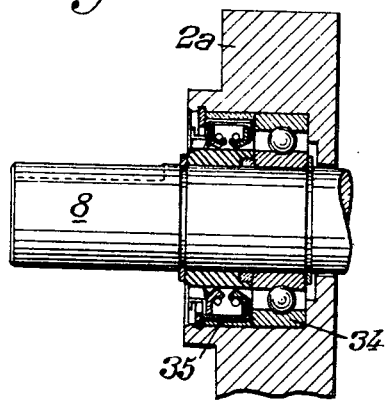
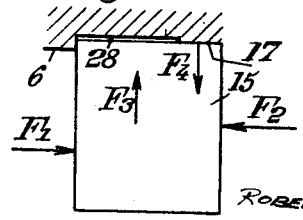

Aug. 6, 1968　　　　R. J. J. GELIN　　　3,395,646
HYDRAULIC GEAR PUMPS AND MOTORS
Filed Feb. 7, 1966　　　　　　　　　　5 Sheets-Sheet 4
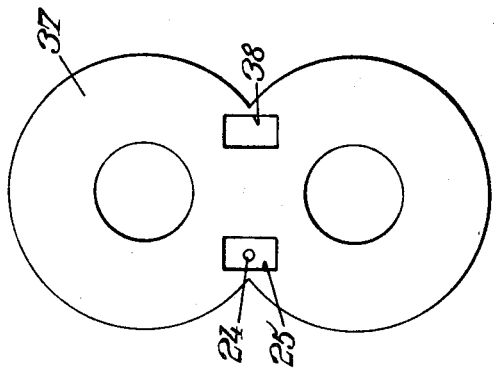
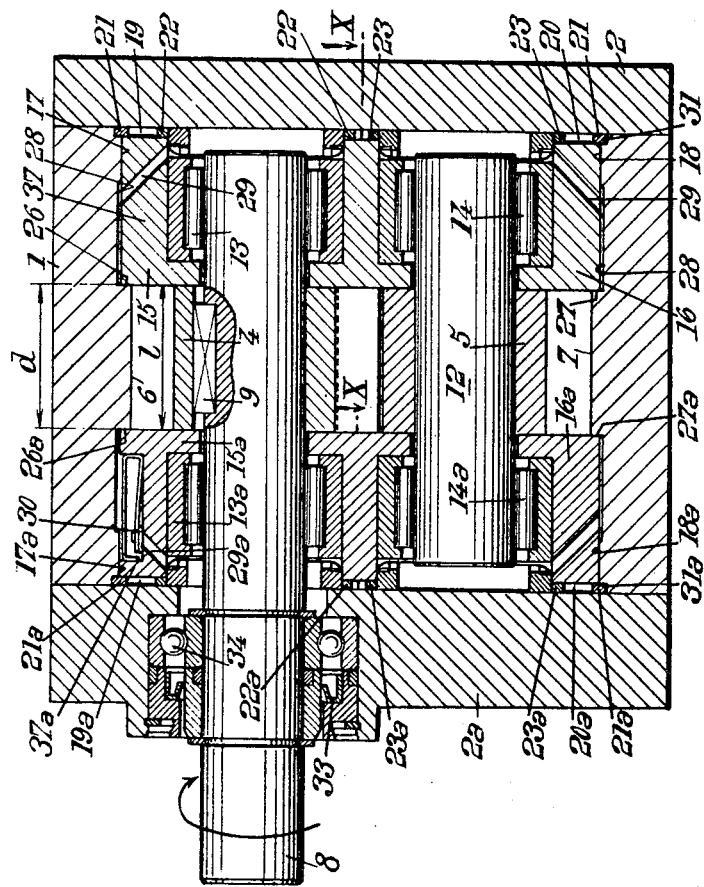
INVENTOR
ROBERT JEAN JOSEPH GELIN
BY
*Bailey, Stephens & Huettig*
ATTORNEYS

United States Patent Office 3,395,646
Patented Aug. 6, 1968

3,395,646
HYDRAULIC GEAR PUMPS AND MOTORS
Robert Jean Joseph Gelin, Lyon, France, assignor to Societe Industrielle de Mecanique Appliquee S.I.G.M.A., Paris, France
Filed Feb. 7, 1966, Ser. No. 525,396
Claims priority, application France, Feb. 16, 1965, PV 5,807
9 Claims. (Cl. 103—126)

ABSTRACT OF THE DISCLOSURE

The gears are carried, on at least one of their sides, by rigid bearings movable in the axial direction, and means are provided for urging these bearings towards the sides of the corresponding gear. Abutment means, such as shoulders, limit the minimum distance between the side surfaces of the two bearings associated with each gear to a value slightly greater than the width of that gear, whereby there is always a minimum clearance between the flanks or side surfaces of the gears and the adjacent side surfaces of their corresponding bearings.

---

Figure 1:
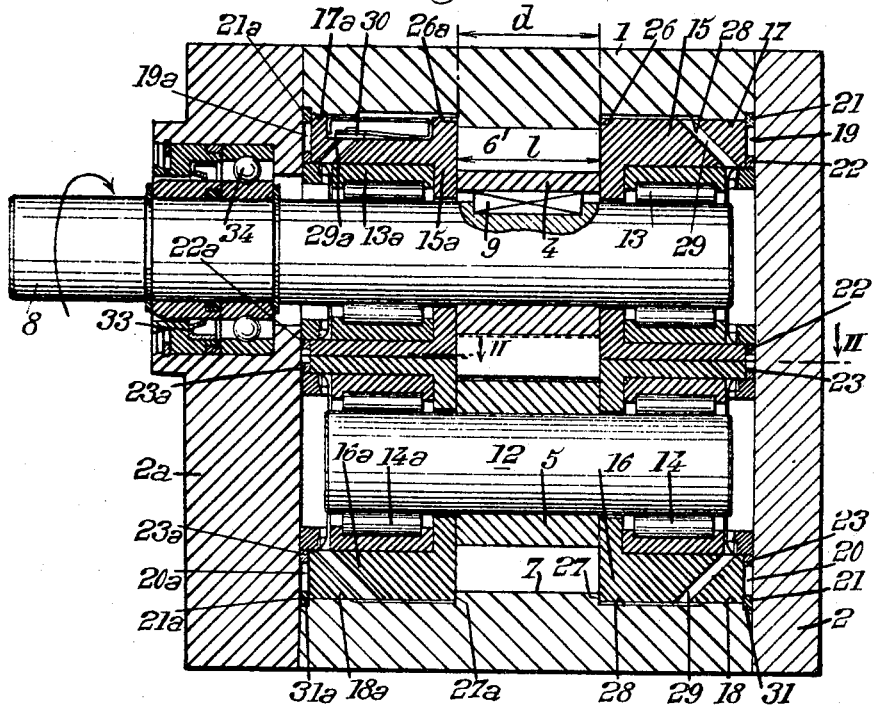

The present invention relates to hydraulic gear pumps and motors wherein the gears are carried, on at least one of their sides, by rigid bearings movable in the axial direction, and which comprise means for exerting on said bearings a force urging them toward the sides of the gear, these means being for instance such that they introduce, into a chamber partly limited by the side surface of these bearings which is turned toward the outside with respect to the gears, a liquid the pressure of which increases with the delivery pressure of the pump or with the suction pressure of the motor.

In known pumps of this kind, the movable bearings have their displacements in the axial direction limited only by their contact with the side faces of the gears, since the result to be obtained is the application of the bearings upon these side surfaces with a force just sufficient to ensure, under normal working conditions, lateral liquid-tightness of the pump. A drawback of such pumps is the difficulty of centering the resultant of the pressure forces which act in the axial direction upon the opposed side faces of the bearings in such manner that the latter are not subjected to the action of a torque tending to pivot them and consequently to wedge them.

Another drawback lies in the fact that the pump can work only if there is not introduced, between the side surfaces of the gears and the adjoining surfaces of the bearings, any dirt capable of preventing a clean contact between these respective surfaces and of injuring the cooperating surfaces of the bearings and gears, respectively. In order to eliminate this last mentioned drawback, it is necessary to provide filtering means the constructional and uptake cost of which may nullify and even exceed the benefit resulting from the improvement in the efficiency of the pump due to floating bearings.

Similar problems arise in the case of similar motors.

The chief object of the present invention is to provide liquid transfer machines, this term including both liquid pumps and liquid motors, adapted to comply better than up to now with the various requirements of practice and in particular capable of eliminating the above mentioned drawbacks of known pumps and motors.

The invention consists chiefly, in pumps and motors of the kind in question, in providing abutment means limiting to a value slightly greater than the width of a gear, the minimum distance between the side surfaces of the two bearings associated with said gear, whereby there is always a minimum clearance between the flank or side surface of a gear and the adjacent side surface of the corresponding bearing. Advantageously, said abutment means consists of a shoulder provided in the casing of the pump or motor between the central housing in which a gear is rotatable and the side housing, of greater diameter than the preceding one, in which is guided a movable bearing.

Other features of my invention will become apparent hereinafter.

Figure 2:
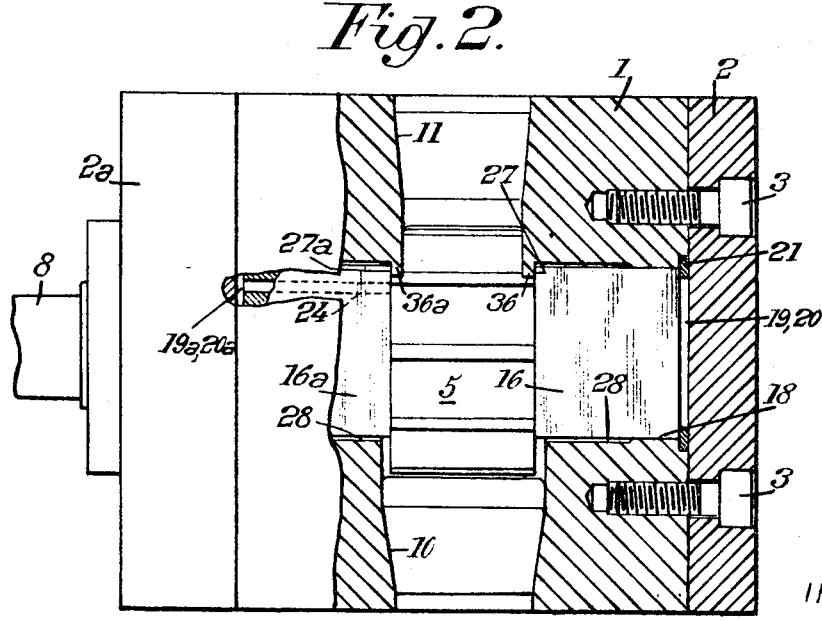
Figure 10:
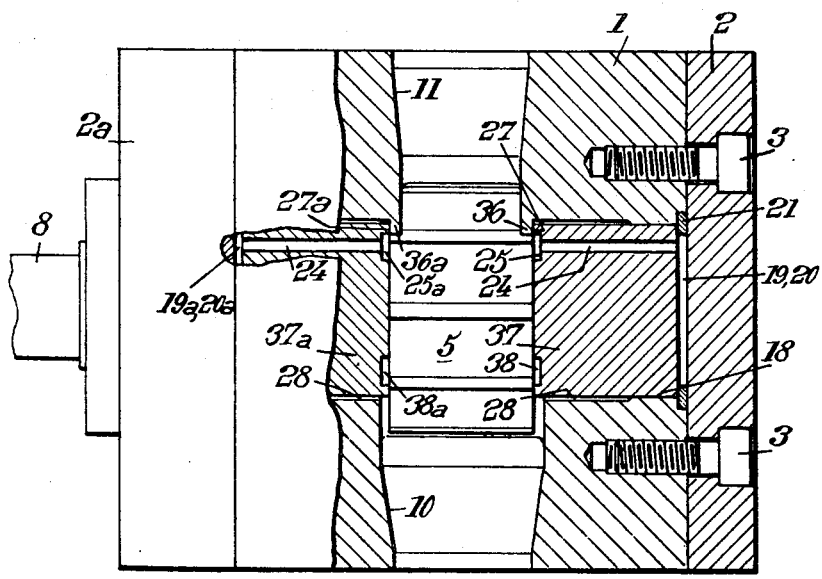

Preferred embodiments of the present invention will be hereinafter described with reference to the appended drawings, given merely by way of example, and in which:

FIG. 1 is an axial sectional view of a first embodiment of a gear pump according to the present invention, FIG. 2 shows the same pump seen from the top of FIG. 1, partly in external view and partly in section on the line II—II of FIG. 1, FIG. 3 shows the body or casing of said pump, seen from the left of FIG. 1, FIG. 4 is a sectional view on the line IV—IV of FIG. 3, the dot-and-dash lines corresponding to portions located at the front of the plane of FIG. 4, FIG. 5 shows one of the bearings of the pump of FIG. 1, to wit the upper right hand side bearing seem from the left of FIG. 1, FIG. 6 is an external view showing the bearing of FIG. 5 in the same position as in FIG. 1, FIG. 7 shows, partly in elevational view and partly in axial sectional view, a gear pump made according to a modification, FIG. 8 shows, in axial sectional view, a portion of a gear pump made according to another modification, FIG. 9 is an axial sectional view of a gear pump made according to another embodiment of the invention, FIG. 10 shows the pump of FIG. 9, soon from the top, partly in external view and partly in section on the line X—X of FIG. 9, FIG. 11 shows one of the double bearings of the pump of FIG. 9, to wit the right hand side bearing, seen from the left of FIG. 9.

The pump according to the present invention comprises a stator, or casing, including a central body 1 and two side plates 2 and 2a assembled to the central body through screws 3. The pump further comprises two intermeshing gears 4 and 5 disposed, respectively, in two housings 6 and 7, gear 4 being made rigid with a driving shaft 8 by means of a key 9. The space in which are located the gears is provided with a suction orifice 10 and a delivery orifice 11. Shaft 8 turns in the direction indicated by the arrow of FIG. 1. Gear 5 is rigid with a shaft 12.

Concerning now the bearings 15–15a and 16–16a of the pump, they are given a cylindrical segment shape and disposed in housings 17–17a and 18–18a which have the same axes as housings 6 and 7 respectively. Shafts 8 and 12 are journalled in said bearings with the interposition of rollers 13–13a and 14–14a, respectively.

As shown, bearings 15, 15a, 16 and 16a are movable axially in their respective housings, but the invention also applies to the case where only the two bearings mounted on one side of the gears, for instance bearings 15 and 16, are movable.

The lateral surface of each bearing which is turned away from the corresponding gear forms one of the walls of an annular chamber, as shown at 19, 20, 19a, 20a. The two chambers, such as 19 and 20 or 19a and 20a located on the same side of the pump communicate between them so as to have together the shape of an 8. On each side, these chambers are provided externally with a packing member 21 or 21a, disposed between side plate 2 or 2a and the pair of bearings 15–16 or 15a–16a which packing member may have a shape as shown by FIG. 3. Said chambers are provided on the inner side with annular packing members 22, 22a, 23, 23a. Packing members 21, 22, 23 and 21a, 22a, 23a are disposed between the movable bearings and the corresponding casing side plates 2, 2a.

In order to introduce into chambers 19, 19a and 20, 20a a liquid the pressure of which varies in the same manner as the delivery pressure of the pump, this liquid is collected at the pump delivery, through conduits 24 extending through at least one of the movable bearings (see FIGS. 2 and 5) and starting from a compression groove 25.

Now, according to the present invention, abutment means are provided to limit to a value slightly greater than the width $l$ of a gear the minimum distance $d$ between the side faces turned toward each other of the two bearings 15 and 15a or 16 and 16a cooperating with said gear.

Advantageously, said abutment means consists of shoulders 26, 26a, 27, 27a provided in pump body 1, between the central housing 6 or 7 and the lateral housings 17, 17a, 18, 18a, whereby the pairs of shoulders 26, 26a and 27, 27a are thus kept at a distance $d$ from each other. Preferably, the shoulders in question consist of the edges of a portion of increased thickness of the wall of body 1, whereby the latter is thickest where the pressure is highest, that is to say where it must support greatest stresses.

As shown by FIG. 3, said shoulders may extend more on the side of the delivery orifice 11 than on the side of the suction orifice 10. In order to permit a better understanding of the operation, small crosses have been marked on FIGS. 3 and 5 to indicate the areas along which the upper movable bearings come into contact with said shoulders. Of course the lower bearing areas are symmetrical of those above stated.

In order to ensure a good filling, the suction orifice 10 is larger than the width of the teeth of the gears (see FIGS. 2 and 4). On the contrary, according to an interesting feature of the invention, the delivery orifice 11 opens between the shoulders, which permits of obtaining direct fluid tightness (that is to say fluid-tightness without packing means) by contact of the bearings upon these shoulders, prevents any circumferential leak about these bearings and increases the mechanical resistance of the casing around the delivery orifice 11.

In order to avoid any risk of pivoting of the bearings, it is advantageous to provide areas 28 of greater diameter in the portions of side housings 17–17a and 18–18a, starting from the central housings 6 and 7, whereby the bearings are guided in casing 1 over only a portion of their length. If $F_1$ is the resultant of the hydraulic thrust forces acting upon the face of a bearing turned toward the corresponding gear; $F_2$ the balancing force due to the pressure in one of the chambers 19, 19a, 20, and 20a; $F_3$ the load of roller 13, 13a, 14 or 14a, and $F_4$ the reaction of casing 1, it is seen (FIG. 6) that the torques $F_1/F_2$ and $F_3/F_4$ balance each other and prevent any tendency to pivoting.

Advantageously, each bearing is provided with a conduit 29, or 29a, starting from the inside of said bearing, leading to an area 28 of increased diameter and permitting back flow of the leaks to suction orifice 10 in view of the fact that, as shown by FIG. 2, this area communicates freely with this orifice. As shown by FIG. 1, the conduit 29a of the bearing through which extends shaft 8 may be provided with a check valve 30.

Concerning packing members 21, 21a, they are disposed partly in respective housings 31 or 31a (FIGS. 1 and 3) provided at the end of casing 1, whereby a single packing member ensures liquid-tightness not only in chambers 19, 19a, 20, 20a but also between body 1 and side plates 2 and 2a.

Concerning packing members 22–22a, 23–23a, they may be disposed directly between the casing side plates 2 and 2a and the movable bearings, as shown by FIG. 1. It is also possible, as shown by FIG. 7, to dispose them between flanges 2 and 2b and plates 32 disposed at the ends of the bearings, which permits of giving said packing members a diameter smaller than the inner diameter of bearings such as 15a and 16a and consequently, of increasing the cross section of annular chambers 19a and 20a.

Various solutions may be adopted for the passage of shaft 8 through one of the side plates, such as 2a in FIG. 1.

According to the embodiment of FIG. 1, there is provided, for this passage of the shaft, in addition to a packing member 33 adapted to resist only overpressures, a ball bearing 34, in view of the fact that key 9 gives shaft 8 some axial freedom.

According to the embodiment of FIG. 7, where the flange through which passes shaft 8 is designated by reference numeral 2b, there is provided only a packing member 33, ball bearing 34 being done away with due to the fact that shaft 8 has no axial freedom with respect to the gear with which it is rigid.

Finally, the embodiment of FIG. 8 comprises, same as that of FIG. 1, a ball bearing 34 and a packing device, but the latter, which is designated in this case by reference numeral 35, is arranged to resist both overpressures and pressures lower on the inner side of flange 2a than on the outer side thereof, which permits of dispensing with the check valve 30 of FIG. 1.

Anyway, gears 4 and 5 are mounted with some axial freedom so that they can be automatically centered with respect to shoulders 26, 26a, 27, 27a by the movable bearings. In the case of FIGS. 1 to 4 and 8, where shaft 8 is maintained axially by a ball bearing 34, key 9 is arranged to permit gear 4 to move with respect to said shaft. In the case of FIG. 7, shaft 8 itself may be made free to move axially and, in this case, gear 4 can be fixed rigidly to the shaft.

The operation of such a pump is as follows:

Being given a pump body or casing 1, the minimum lateral clearance or play between the gears and the movable bearings (differences $d-l$) may be adjusted by choosing gears of suitable width $l$. This play may be of the order of magnitude of some hundredths of a millimeter and its value may be determined either in accordance with a predetermined efficiency or in accordance with the maximum dimensions of the solid particles contained in the liquid propelled by the pump. The materials of which the casing and the gears are made are chosen in such manner that difference $(d-l)$ varies relatively little despite temperature variations.

Bearings 15, 15a, 16, 16a are kept in abutment relation with the corresponding shoulders 26, 26a, 27, 27a, respectively, of casing 1 under the effect of a hydraulic thrust, which makes the pump irresponsive to the effect of expansions due to heatings. This hydraulic thrust is not a balancing one contrary to what takes place in the pumps of the prior art above referred to, and therefore its value must be only a little greater than the hydraulic reaction which tends to move the bearings away from each other. The point of application of this thrust has much less importance than in the case of a pump where the clearance is fully taken up and it may without inconvenience be either symmetrical or non-symmetrical with respect to the axis of the gears, which facilitates the machining of the pump.

When some dirt particle passes between the flank surfaces of the gears and the movable bearings it does not disturb the play thereof and cannot cause abrasion of the side walls of the pump.

Recesses 28 permit of reducing the stresses in body 1 and/or of reducing the weight of this body by limiting the area exposed to the pressure forces to only the width of gears 4 and 5 and of the ribs 36, 36a which remain at the level of orifice 11 on the side of shoulders 27 and 27a (FIG. 2), liquid-tightness between orifices 10 and 11 being ensured by the areas of the bearings which are applied against the shoulders of casing 1. Another advantage of these recesses 28 is to facilitate the machining of shoulders 26, 26a in order to improve their liquid-tight cooperation with the corresponding bearings. These recesses permit, by circulation of the leaking fluid, of making the temperature of the apparatus more uniform.

Contrary to what takes place in known pumps made according to the prior art and without movable bearings, the variations of axial dimensions due to temperature variations and to mechanical stresses may take place freely and act to modify the operational clearances only over the reduced length $d$.

Whereas the apparatus illustrated by FIGS. 1 to 8 are pumps, what has been said concerning them may apply also to hydraulic motors and permits the operation thereof with a counter-pressure at the exhaust, because to any increase of the force $F_1$ due to this counter-pressure, it suffices to oppose a sufficient force $F_2$, which is made possible by the fact that there is no friction between the gears and the bearings.

According to another modification, the hydraulic means above described to keep the bearings against the shoulders, might be replaced by resilient means (metallic springs or the like).

According to the embodiment of FIGS. 9 to 11, the two bearings 15 and 16 located on one side of the pair of gears 4 and 5 are replaced by a single rigid piece 37, the two bearings 15a and 16a located on the other side being likewise replaced by a single rigid piece 37a. Each of these two pieces 37, 37a is 8-shaped and is provided with a conduit 24 in its transverse plane of symmetry, that is to say the plane of symmetry which is horizontal in FIG. 11. As shown by said FIG. 11, the filling groove 25 and a decompression groove 38 (or 38a) are located astride this plane of symmetry. Apart from these differences, the pump of FIGS. 9 to 11 is similar to that of FIGS. 1 to 6.

The embodiment of FIGS. 9 to 11 has the following advantages over that of FIGS. 1 to 6:

Simplicity of arrangement (reduction from four to two of the number of pieces constituting the bearings).

Reduction of the cost of manufacture (elimination of the flat surfaces that were provided for contact between the separate bearing elements of the prior embodiments).

Improvement of the geometry of alignment of bearings 13, 13a, 14, 14a.

Elimination of the tendency of the bearings to pivot under the effect of the hydraulic forces, the friction faces always remaining in the same plane.

Finally and chiefly, possibility of using bearings such as 37 and 37a each made of a single piece the external outline of which may be less accurately machined.

This last advantage is due to the fact that liquid-tightness between the casing and bearings 37 and 37a is ensured only on the lateral faces against shoulders 26, 27, 26a, 27a and not on the outside of the bearings. The bearings therefore act merely to support the journals and may accordingly be obtained in a much more economic manner, for instance by sintering.

In a general manner, while the above description discloses what is deemed to be practical and efficient embodiments of the present invention, said invention is not limited thereto as there might be changes made in the arrangement, disposition and form of the parts without departing from the principle of the invention as comprehended within the scope of the appended claims.

I claim:

1. A liquid transfer machine which comprises, in combination:

a casing including a central body and two side plates, the inner wall of said body limiting cylindrical central housings provided with an inlet passage and an outlet passage, a pair of gears in mesh with each other and having their respective axes parallel to each other, said gears fitting slidably in said housings, respectively, and coacting, in rotation, with the liquid flowing from said inlet passage to said outlet passage, the inner wall of said casing further limiting cylindrical side housings in opposite sides of said central housings, bearings for said gears journalled in said side housings, respectively, at least the bearings on one side of said gears being rigid and slidable in their respective side housings parallelly to the direction of said axes, means for urging said slidable bearings toward the corresponding gears, and abutment means carried by said casing for limiting the distance between the inner sides of said bearings to a value slightly greater than the width of said gears.

2. A liquid transfer machine which comprises, in combination:

a casing including a central body and two side plates, the inner wall of said body limiting cylindrical central housings provided with an inlet passage and an outlet passage, a pair of gears, in mesh with each other and having their respective axes parallel to each other, said gears fitting slidably in said housings, respectively, and coacting, in rotation, with the liquid flowing from said inlet passage to said outlet passage, the inner wall of said casing further limiting cylindrical side housings on opposite sides of said central housings, bearings for said gears journalled in said side housings, respectively, at least the bearings on one side of said gears being rigid and slidable in their respective side housings parallelly to the direction of said axes, the side plates of said casing limiting, with the outer sides of said bearings, lateral chambers adapted to be fed with liquid at a pressure varying in the same manner as that existing in said central housings on the side of said pair of gears where the liquid pressure is higher than on the other side, for urging said slidable bearings toward each other, and abutment means carried by said casing for limiting the distance between the inner sides of said bearings to a value slightly greater than the width of said gears.

3. A machine according to claim 1 wherein the diameters of said side housings are greater than those of said central housings respectively, so as to form shoulders constituting said abutment means.

4. A machine according to claim 3 acting as a pump wherein said inlet passage is a suction passage and has a width greater than the width of said gears and said outlet passage is a delivery passage and opens between said shoulders.

5. A machine according to claim 2 wherein said side housings have in the portions thereof adjoining said central housings, a diameter greater than the external diameter of said respective bearings so that each of said bearings is in contact with said central body only over a portion of its length.

6. A machine according to claim 5 wherein at least one of said bearings is provided with a leak return conduit in communication with the corresponding portion of greater diameter of the corresponding side housing.

7. A machine according to claim 2 wherein each pair, located on one side of said central housings, of said chambers located between said bearings, and said casing side plates is arranged in 8-shaped fashion, the two chambers of said pair communicating together, further including a packing member disposed between said central body and the corresponding casing side plate so as to ensure liquid tightness both for the corresponding chambers and between said casing central body and said side plates.

8. A machine according to claim 1 wherein the two bearings located on the same side of said pair of gears are integral with each other and form a single rigid piece.

9. A machine according to claim 8 wherein said rigid piece is provided with a conduit parallel to the axes of said gears and located in the transverse plane of symmetry of said piece for feeding said lateral chambers with liquid under a pressure varying in the same manner as that existing in said central housings on the side of said pair of gears where the liquid pressure is higher than on the other side.

References Cited

UNITED STATES PATENTS

| 2,412,588 | 12/1946 | Lauck | 103—126 |
| 3,285,188 | 11/1966 | Kita | 103—126 |
| 2,420,622 | 5/1947 | Roth et al. | 103—126 |

FOREIGN PATENTS

| 1,003,844 | 9/1965 | Great Britain. |

FRED C. MATTERN, JR., *Primary Examiner.*

WILBUR J. GOODLIN, *Assistant Examiner.*